US012337405B2

United States Patent
Winkelhofer et al.

(10) Patent No.: US 12,337,405 B2
(45) Date of Patent: Jun. 24, 2025

(54) RESISTANCE SPOT WELDED JOINT COMPRISING A ZINC COATED AHSS STEEL SHEET

(71) Applicant: VOESTALPINE STAHL GMBH, Linz (AT)

(72) Inventors: Florian Winkelhofer, Kirchberg-Thening (AT); Thomas Hebesberger, Pasching (AT); Martin Gruber, Pregarten (AT)

(73) Assignee: VOESTALPINE STAHL GMBH, Linz (AT)

( * ) Notice: Subject to any disclaimer, the term of this patent is extended or adjusted under 35 U.S.C. 154(b) by 710 days.

(21) Appl. No.: 17/289,569

(22) PCT Filed: Nov. 28, 2019

(86) PCT No.: PCT/EP2019/082854
§ 371 (c)(1),
(2) Date: Apr. 28, 2021

(87) PCT Pub. No.: WO2020/109444
PCT Pub. Date: Jun. 4, 2020

(65) Prior Publication Data
US 2022/0010827 A1   Jan. 13, 2022

(30) Foreign Application Priority Data

Nov. 30, 2018  (SE) .................... 1851500-7

(51) Int. Cl.
| | |
|---|---|
| *B23K 11/16* | (2006.01) |
| *B23K 11/11* | (2006.01) |
| *B23K 11/20* | (2006.01) |
| *B32B 15/01* | (2006.01) |
| *C21D 1/26* | (2006.01) |
| *C21D 6/00* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C22C 38/18* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/32* | (2006.01) |
| *C23C 2/06* | (2006.01) |
| *C22C 38/34* | (2006.01) |
| *C22C 38/38* | (2006.01) |

(52) U.S. Cl.
CPC .............. *B23K 11/20* (2013.01); *B23K 11/11* (2013.01); *B23K 11/16* (2013.01); *B32B 15/011* (2013.01); *C21D 1/26* (2013.01); *C21D 6/005* (2013.01); *C21D 6/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/18* (2013.01); *C22C 38/22* (2013.01); *C22C 38/24* (2013.01); *C22C 38/26* (2013.01); *C22C 38/28* (2013.01); *C22C 38/32* (2013.01); *C23C 2/06* (2013.01); *C21D 2211/00* (2013.01); *C21D 2211/005* (2013.01); *C22C 38/34* (2013.01); *C22C 38/38* (2013.01)

(58) Field of Classification Search
CPC ..................................................... C22C 38/04
See application file for complete search history.

(56) References Cited

U.S. PATENT DOCUMENTS

2020/0181750 A1\*  6/2020  Venkatasurya ...... C21D 8/0205

FOREIGN PATENT DOCUMENTS

| | | | |
|---|---|---|---|
| CN | 101437975 A | 5/2009 | |
| CN | 102414335 A | 4/2012 | |
| CN | 108431241 A | 8/2018 | |
| EP | 0666332 A1 \* | 8/1995 | ............... C21D 8/02 |
| EP | 3052672 A2 | 8/2016 | |
| WO | 2017108251 A1 | 6/2017 | |
| WO | 2017108866 A1 | 6/2017 | |
| WO | 2017109542 A1 | 6/2017 | |

(Continued)

OTHER PUBLICATIONS

Chinese Office Action dated Jul. 25, 2022, for Chinese Patent Application No. 201980074584.8.

(Continued)

*Primary Examiner* — Jophy S. Koshy
(74) *Attorney, Agent, or Firm* — KARCESKI IP LAW, PLLC

(57) ABSTRACT

A resistance spot welded joint of at least two steel sheets and a method of producing a resistance spot welded joint of at least two steel sheets, wherein at least one of the steel sheets is provided with a Zn containing layer, the steel sheet has a tensile strength of at least 980 MPa, a multiphase microstructure comprising bainite, bainitic ferrite and tempered martensite in a total amount of at least of 75 volume % and retained austenite in an amount of 3-20 volume % and wherein the steel sheet provided with the Zn containing layer has a composition consisting of (in wt. %): C 0.1-0.3; Si 0.2-3.0; Mn 1.0-3.0; Cr≤2.0; Mo≤0.5; Al≤2.0; Nb≤0.2; V≤0.2; Ti 0.01-0.15; B 0.0005-0.01; and balance Fe apart from impurities, wherein the heat affected zone in the spot welded joint is free from cracks having a length of more than 500 μm.

12 Claims, No Drawings

(56) References Cited

FOREIGN PATENT DOCUMENTS

| WO | 2017125809 A1 | 7/2017 |
| WO | 2018096090 A1 | 5/2018 |
| WO | 2018162937 A1 | 9/2018 |
| WO | 2018202916 A1 | 11/2018 |

OTHER PUBLICATIONS

Diptak Bhattacharya, "Liquid metal embrittlement during resistance spot welding of Zn-coated high-strength steels," Materials Science and Technology, 34:15, 1809-1829, DOI: 10.1080/02670836.2018.1461595, Jan. 12, 2018.

Wirthl, Edwin; Pichler, Andreas; Angerer, Reinhold; Stiaszny, Peter; Hauzenberger, Karl; Titovets, Yuri F.; Hackl, Michael: "Determination of the volume amount of retained austenite and ferrite in small specimens by magnetic measurements," Proc. Int. Conf. on TRIP-aided high strength ferrous alloys, Ghent, Belgium, p. 61-64, 2002.

International Search Report dated Feb. 4, 2020, for International Patent Application No. PCT/EP2019/082854.

\* cited by examiner

RESISTANCE SPOT WELDED JOINT COMPRISING A ZINC COATED AHSS STEEL SHEET

CROSS-REFERENCE TO RELATED APPLICATIONS

This is a National Stage Entry into the United States Patent and Trademark Office from International Patent Application No. PCT/EP2019/082854, filed on Nov. 28, 2019, which claims priority to Swedish Patent Application No. SE 1851500-7, filed on Nov. 30, 2018, the entire contents of both of which are incorporated herein by reference.

FIELD OF THE INVENTION

The present invention relates to a resistance spot welded (RSW) joint of at least two steel sheets suitable for applications in automobiles, wherein at least one of the steel sheets is an Advanced High Strength Steel (AHSS). In particular, the invention relates to a RSW joint wherein the AHSS steel sheet has a tensile strength of at least 980 MPa, a multiphase microstructure comprising bainite, bainitic ferrite and tempered martensite in a total amount of at least of 75 volume % and retained austenite in an amount of 3-20 volume % and wherein the steel sheet provided with the Zn containing layer wherein the heat affected zone in the spot welded joint is free from cracks having a length of more than 500 μm.

BACKGROUND OF THE INVENTION

For a great variety of applications increased strength levels are a pre-requisite for light-weight constructions in particular in the automotive industry, since car body mass reduction results in reduced fuel consumption. Various AHSS steels have therefore been used in order to reduce the body-in-white (BIW) weight of the vehicles. However, welding defects such as surface cracking may occur in RSW joints of Zn-coated steels. A state-of-the-art review on the surface crack evolution due to liquid metal embrittlement during spot welding is given in the recent article: Diptak Bhattacharya (2018), Liquid metal embrittlement during resistance spot welding of Zn-coated high-strength steels, Materials Science and Technology, 34:15, 1809-1829, DOI: 10.1080/02670836.2018.1461595.

WO 2018/162937 A1 discloses A method for resistance spot welding comprising the following successive steps: —providing at least two steel sheets with thickness (th) comprised between 0.5 and 3 mm, at least one of the sheets being a zinc or zinc-alloy coated steel sheet (A) with a tensile strength (TS) higher than 800 MPa and a total elongation (TEL) such as (TS)×(TEL)>14000 MPa %, wherein the composition of the steel substrate of (A) contains, in weight: $0.05\% \leq C \leq 0.4\%$, $0.3\% \leq Mn \leq 8\%$, $0.010\% \leq Al \leq 3\%$, $0.010\% \leq Si \leq 2.09\%$, with $0.5\% \leq (Si+Al) \leq 3.5\%$, $0.001\% \leq Cr \leq 1.0\%$, $0.001\% \leq Mo \leq 0.5\%$ and optionally: $0.005\% \leq Nb \leq 0.1\%$, $0.005\% < V \leq 0.2\%$, $0.005\% \leq Ti \leq 0.1\%$, $0.0003\% \leq B \leq 0.005\%$, $0.001\% \leq Ni \leq 1.0\%$, the remainder being Fe and unavoidable impurities, —performing resistance spot welding of the at least two steel sheets for producing a weld with an indentation depth (IDepth) on the surface of said steel sheet (A) such as: $100 \mu m \leq (IDepth) \leq 18.68 \, (Znsol) - 55.1$, wherein (IDepth) is in micrometers and wherein Znsol is the solubility of Zn in the steel of sheet (A) at 750° C., in weight %.

EP 3 052 672 B1 is directed to a spot welded joint of at least two steel sheets, wherein at least one of the steel sheets presents yield strength above or equal to 600 MPa, an ultimate tensile strength above or equal to 1000 MPa, uniform elongation above or equal to 15%. The base metal chemical composition comprises $0.05 \leq C \leq 0.21\%$, $4.0 \leq Mn \leq 7.0\%$, $0.5 \leq Al \leq 3.5\%$, $Si \leq 2.0\%$, $Ti \leq 0.2\%$, $V \leq 0.2\%$, $Nb \leq 0.2\%$, $P \leq 0.025\%$, $B \leq 0.0035\%$, and the spot welded joint contains a molten zone microstructure containing more than 0.5% of Al and containing a surface fraction of segregated areas lower than 1%, said segregated areas being zones larger than 20 m² and containing more than the steel nominal phosphorus content.

Although RSW of AHSS is an established technique there is a need for further reducing the susceptibility to welding defects, in particular because there is a strive to use highly alloyed AHSS steels having increased strength levels, which in turn results in more severe conditions during RSW.

SUMMARY OF THE INVENTION

The present invention is directed to a resistance spot welded joint of at least two steel sheets, wherein at least one of the steel sheets is an AHSS steel sheet provided with a Zn containing layer. The AHSS steel sheet has a tensile strength of at least 980 MPa, a multiphase microstructure comprising bainite, bainitic ferrite and tempered martensite in a total amount of at least of 75 volume % and retained austenite in an amount of 3-20 volume % wherein the heat affected zone in the resistance spot welded joint is free from cracks having a length of more than 500 μm.

The general object of the present invention is to improve the weldability and joint properties of resistance welded joints comprising at least one AHSS steel sheet provided with a Zn containing layer in order to improve their applicability in the car industry.

A specific object is to reduce the length of Liquid Metal Embrittlement (LME) cracks in the Heat Affected Zone (HAZ) to no more than 500 μm, preferably to no more than 300 μm, in order to improve the strength of the resistance spot welded joint.

The forgoing objects, as well as additional advantages are achieved to a significant measure by providing a resistance spot welded joint as defined in the claims.

The invention is described herein.

DETAILED DESCRIPTION

The general object of the present invention is obtained by providing a resistance welded joint.

The thickness of the steel sheets may be in the range of 0.5 to 3 mm, in particular between 1 and 2 mm. The steel sheets may be cold rolled.

At least one of the steel sheets has a tensile strength of at least 980 MPa, a multiphase microstructure comprising bainite, bainitic ferrite and tempered martensite in a total amount of at least 75 volume % and retained austenite in an amount of 3-20 volume % and wherein said steel sheet provided with the Zn containing layer. The thickness of the steel sheet is generally in the range of 0.4-3 mm, preferably 0.6-2.2 mm. The thickness range of 1.0-1.6 mm is particular suitable for a large number of applications.

The Zn containing layer may be a hot dip galvanised (GI), coating a galvannealed (GA) coating or an electrogalvanized (EG) coating. The thickness of the coating containing the Zn containing layer may be 2-70 µm, preferably 5-20 µm. The EG coating is generally in the range of 2-10 µm, preferably 2.5-7.5 µm.

The composition of the coated steel sheet has a consisting of the following alloying elements (in wt. %):

| | |
|---|---|
| C | 0.1-0.3 |
| Si | 0.2-3.0 |
| Mn | 1.0-3.0 |
| Cr | ≤2.0 |
| Mo | ≤0.5 |
| Al | ≤2.0 |
| Nb | ≤0.2 |
| V | ≤0.2 |
| Ti | 0.01-0.15 |
| B | 0.0005-0.01 | balance Fe apart from impurities.

The importance of the separate elements and their interaction with each other as well as the limitations of the chemical ingredients of the claimed alloy are briefly explained in the following. All percentages for the chemical composition of the steel are given in weight % (wt. %) throughout the description. Upper and lower limits of the individual elements can be freely combined within the limits set out in the claims. The arithmetic precision of the numerical values can be increased by one or two digits for all values given in the present application. Hence, a value of given as, e.g., 0.1% can also be expressed as 0.10 or 0.100%. The amounts of the microstructural constituents are given in volume % (vol. %).

C: 0.1-0.3%

C stabilizes the austenite and is important for obtaining sufficient carbon within the retained austenite phase. C is also important for obtaining the desired strength level. Generally, an increase of the tensile strength in the order of 100 MPa per 0.1% C can be expected. When C is lower than 0.1% then it is difficult to attain a tensile strength of 980 MPa. If C exceeds 0.3%, then the weldability is impaired. The upper limit may be 0.29, 0.28, 0.27, 0.26, 0.25, 0.24, 0.23 or 0.22%. The lower limit may be 0.12, 0.13, 0.14, 0.15, 0.16, 0.17, 0.18, 0.19, or 0.20%.

Si: 0.2-3.0%

Si acts as a solid solution strengthening element and is important for securing the strength of the thin steel sheet. Si suppresses the cementite precipitation and is essential for austenite stabilization.

However, if the content is too high, then too much silicon oxides may form on the strip surface, which may lead to cladding on the rolls in the CAL and, as a result thereof, to surface defects on subsequently produced steel sheets. The upper limit may therefore be limited to 2.0, 1.9, 1.8, 1.7, 1.6, 1.5, 1.4, 1.3 or 1.2%. The lower limit may be 0.4, 0.5, 0.6, 0.7, 0.75 or 0.80%.

Mn: 1.0-3.0

Manganese is a solid solution strengthening element, which stabilises the austenite by lowering the $M_s$ temperature and prevents ferrite and pearlite to be formed during cooling. In addition, Mn lowers the $A_{c3}$ temperature and is important for the austenite stability. At a content of less than 1.0% it might be difficult to obtain the desired amount of retained austenite, a tensile strength of 980 MPa and the austenitizing temperature might be too high for conventional industrial annealing lines. In addition, at lower contents it may be difficult to avoid the formation of polygonal ferrite. However, if the amount of Mn is higher than 3.0%, problems with segregation may occur because Mn accumulates in the liquid phase and causes banding, resulting in a potentially deteriorated workability. A preferred range is 2.2-2.8%. The upper limit may be 2.7, 2.6, 2.5 or 2.4%. The lower limit may be 1.2, 1.3, 1.4, 1.5, 1.6, 1.7, 1.8, 1.9, 2.0, 2.1, 2.2, 2.3 or 2.4%.

Cr: ≤2.0

Cr is effective in increasing the strength of the steel sheet. Cr is an element that forms ferrite and retards the formation of pearlite and bainite. The $A_{c3}$ temperature and the $M_s$ temperature are only slightly lowered with increasing Cr content. Cr results in an increased amount of stabilized retained austenite. The amount of Cr is limited to 2.0%. A preferred range is 0.1-0.8%. The upper limit may be 0.75, 0.70, 0.65, 0.60, 0.55, 0.50, 0.45 or 0.40, 0.35, 0.30 or 0.25%. The lower limit may be 0.01, 0.05, 0.10, 015, 0.20 or 0.25%. A deliberate addition of Cr need not be conducted according to the present invention.

Mo: ≤0.5

Mo may optionally be contained in an amount of up to 0.5% for increasing the hardenability and delaying the formation of perlite. Mo delays the decomposition of austenite and stabilizes the retained austenite. Amounts of more than 0.5% results in high costs. The upper limit may be set to 0.4%, 0.3%, 0.2% or 0.1%. The lowest amount may be set to 0.001, 0.005, 0.01, 0.02, 0.03, 0.04 or 0.05%.

Al: ≤2.0, preferably 0.03-1.0%

Al promotes ferrite formation and is also commonly used as a deoxidizer. Al, like Si, is not soluble in the cementite and therefore it considerably delays the cementite formation during bainite formation. Additions of Al result in a remarkable increase in the carbon content in the retained austenite. However, the M temperature is also increased with increasing Al content. A further drawback of Al is that it results in a drastic increase in the $A_{c3}$ temperature. However, a main disadvantage of Al is its segregation during casting. During casting Mn is enriched in the middle of the slabs and the Al-content is decreased. Therefore, in the middle of the slab a significant austenite stabilized region or band may be formed. This results at the end of the processing in martensite banding and that low strain internal cracks are formed in the martensite band. On the other hand, Si and Cr are also enriched during casting. Hence, the propensity for martensite banding may be reduced by alloying with Si and Cr, since the austenite stabilization due to the Mn enrichment is counteracted by these elements. For these reasons the Al content is preferably limited. The steel is preferably Al-killed and a preferred range is 0.03-1.0%. The upper level may be 0.9, 0.8, 0.7, 0.6, 0.5, 0.4, 0.3, 0.2 or 0.1%. The lower limit may be set to 0.04, 0.05, 0.06, 0.07, 0.08, 0.09 or 0.1%. If Al is used for deoxidation only then the upper level may then be 0.09, 0.08, 0.07 or 0.06%. For securing a certain effect the lower level may set to 0.03 or 0.04%.

Nb: ≤0.2%

Nb is commonly used in low alloyed steels for improving strength and toughness, because of its influence on the grain size. Nb increases the strength elongation balance by refining the matrix microstructure and the retained austenite phase due to precipitation of NbC. The steel may contain Nb in an amount of ≤0.2%, preferably ≤0.04% or even ≤0.03%. A deliberate addition of Nb is not necessary according to the present invention. The upper limit may therefore be restricted to ≤0.01%.

V: ≤0.2%

The function of V is similar to that of Nb in that it contributes to precipitation hardening and grain refinement. The steel may contain V in an amount of ≤0.2%, preferably ≤0.04% or even ≤0.03%. A deliberate addition of V is not necessary according to the present invention. The upper limit may therefore be restricted to ≤0.01%.

Ti: 0.01-0.15, preferably 0.02-0.04%

Ti is commonly used in low alloyed steels for improving strength and toughness, because of its influence on the grain size by forming carbides, nitrides or carbonitrides. In particular, Ti is a strong nitride former and can be used to bind the nitrogen in the steel. However, the effect tends to be saturated above 0.04%. In order to having a good fixation of N to Ti the lower amount should be 0.01%.

B: 0.0005-0.01, preferably 0.001-0.005%

B suppresses the formation of ferrite and improves the weldability of the steel sheet. In order to have a noticeable effect at least 0.0005% should be added. However, excessive amounts of deteriorate the workability. The upper limit is therefore 0.01%. A preferred range is 0.001-0.005% and a more preferred range is 0.002-0.004%.

Cu: ≤0.15%

Cu is an undesired impurity element that may be restricted to ≤0.15% by careful selection of the scrap used. The upper limit may be restricted to 0.12, 0.10, 0.08 or 0.06%.

Ni: ≤0.15%

Ni is also an undesired impurity element that may be restricted to ≤0.15% by careful selection of the scrap used. The upper limit may be restricted to 0.12, 0.10, 0.08 or 0.06%.

Other impurity elements may be comprised in the steel in normal occurring amounts. However, it is preferred to limit the amounts of P, S to the following optional maximum contents:

P: ≤0.02%
S: ≤0.005%

It is also preferred to control the nitrogen content to the range:

N: 0.003-0.005%

In this range a stable fixation of the nitrogen can be achieved.

Ti/B: 5-30

The ratio Ti/B is preferably adjusted to be in the range of 5-30 in order to secure an optimal fixation of the nitrogen in the steel, resulting in free unbounded boron in the steel.

The microstructural constituents are in the following expressed in volume % (vol. %).

The cold rolled steel sheets of the present invention have a microstructure mainly consisting of retained austenite embedded in a matrix of bainitic ferrite (BF), i.e. the amount of bainitic ferrite is generally ≥50 vol. %. The lower amount of BF may be set to 55, 60, 65 or 70 vol. %.

The microstructure may also contain up to 30 vol. % tempered martensite (TM) and up to 20 vol. % fresh martensite (FM). The latter may be present in the final microstructure because, depending on its stability, some austenite may transform to martensite, e.g. during cooling at the end of an overaging step. The amount of FM may be limited to 19, 18, 17, 16, 15, 14, 13, 12, 11, 10, 9, 8, 7, 6 or 5 vol. %. These un-tempered martensite particles are often in close contact with the retained austenite particles and they are therefore often referred to as martensite-austenite (MA) particles.

Retained austenite is a prerequisite for obtaining the desired TRIP effect. The amount of retained austenite should therefore be in the range of 3.5-20 vol. %, preferably 5-15 vol. %. The lower limit of retained austenite may be 4.0, 4.5, 5.0, 5.5, 6.0, 6.5 or 7.0 vol. %: The upper limit may be restricted to 19, 18, 17, 16 15 or 14 vol. %. The amount of retained austenite was measured by means of the saturation magnetization method described in detail in Proc. Int. Conf. on TRIP-aided high strength ferrous alloys (2002), Ghent, Belgium, p. 61-64.

Polygonal ferrite (PF) is not a desired microstructural constituent and is therefore limited to ≤10 vol. %. The upper limit may be 9, 8, 7, 6, 5, 4, 3, 2 or 1 vol. %. Most preferably, the steel is free from PF.

The mechanical properties of the steel sheet provided with the Zn containing layer are important and the tensile strength ($R_m$) should be at least 980 MPa, preferably at least one of the following requirements are fulfilled:

| tensile strength ($R_m$) | 1100-1350 MPa |
| yield strength ($R_{p0.2}$) | 780-1100 MPa |
| total elongation ($A_{50}$) | ≥7, in particular 10% |
| hole expansion ratio ($\lambda$) | ≥20% |
| yield ratio ($R_{p0.2}/R_m$) | ≥0.50, in particular ≥ 0.60, preferably ≥ 0.70 |

More preferably, all these requirements are fulfilled at the same time.

The $R_m$ and $R_{p0.2}$ values are derived according to the European norm EN 10002 Part 1, wherein the samples were taken in the longitudinal direction of the strip. The elongation ($A_{50}$) is derived in accordance with the same norm. The lower limit for the tensile strength may be 1000, 1050, 1100, 1150, 1160, 1170, 1180, 1190 or 1200 MPa. The lower limit for the yield strength may be 800, 820, 830, 840, 850, 860, 870, 880, 890, 900, or 100 o MPa. The lower limit for the yield ratio ($R_{p0.2}/R_m$) may be 0.55, 0.60, 0.65, 0.70 or 0.75.

The lower limit for the total elongation ($A_{50}$) may be 8, 9, 10 11, 12 13, 14 or 15%.

The hole expanding ratio ($\lambda$) is the mean value of three samples subjected to hole expansion tests (HET). It was determined by the hole expanding test method according to ISO/TS16630:2009 (E). In this test a conical punch having an apex of 60° is forced into a 10 mm diameter punched hole made in a steel sheet having the size of 100×100 mm$^2$. The test is stopped as soon as the first crack is determined and the hole diameter is measured in two directions orthogonal to each other. The arithmetic mean value is used for the calculation. The lower limit for the hole expanding ratio ($\lambda$) may be 25, 30 or 35%.

The hole expanding ratio ($\lambda$) in % is calculated as follows: $\lambda=(Dh-Do)/Do\times100$ wherein Do is the diameter of the hole at the beginning (10 mm) and Dh is the diameter of the hole after the test.

The mechanical properties of the steel sheets of the present invention can be largely adjusted by the alloying composition and the microstructure. The microstructure may be adjusted by the heat treatment in the CAL, in particular by the isothermal treatment temperature in the overaging step.

The invention defines a resistance spot welded joint of at least two steel sheets, wherein at least one of the steel sheets is provided with a Zn containing layer, the steel sheet has a tensile strength of at least 980 MPa, a multiphase microstructure comprising bainite, bainitic ferrite and tempered martensite in a total amount of at least of 75 volume % and retained austenite in an amount of 3.5-20 volume % and wherein the steel sheet provided with the Zn containing layer has a composition consisting of (in wt. %):

| C | 0.1-0.3 |
| Si | 0.2-3.0 |

-continued

| | |
|---|---|
| Mn | 1.0-3.0 |
| Cr | ≤2.0 |
| Mo | ≤0.5 |
| Al | ≤2.0 |
| Nb | ≤0.2 |
| V | ≤0.2 |
| Ti | 0.01-0.15 |
| B | 0.0005-0.01 | balance Fe apart from impurities, wherein the heat affected zone in the spot welded joint is free from cracks having a length of more than 500 μm.

The maximum length of the cracks can be restricted to 450, 400, 350, 300, 250, 200, 150, 100, 80 or 60 μm.

The steel sheet provided with the Zn containing layer may have a composition fulfilling at least one of the following requirements (in wt. %):

| | |
|---|---|
| C | 0.15-0.25 |
| Si | 0.6-2.0 |
| Mn | 2.2-2.8 |
| Cr | 0.01-0.8 |
| Mo | ≤0.2 |
| Al | 0.03-1.0 |
| Nb | ≤0.04 |
| V | ≤0.04 |
| Ti | 0.02-0.06 |
| B | 0.001-0.007 | wherein the composition fulfils at least one of the following requirements with respect to the impurity contents (in wt. %):

| | |
|---|---|
| Cu | ≤0.15 |
| Ni | ≤0.15 |
| P | ≤0.02 |
| S | ≤0.005 |
| N | 0.003-0.005 | and/or wherein the heat affected zone in the spot welded joint is free from cracks having a length of more than 200 μm.

The steel sheet provided with the Zn containing layer may have a composition consisting of (in wt. %):

| | |
|---|---|
| C | 0.15-0.25 |
| Si | 0.6-2.0 |
| Mn | 2.2-2.8 |
| Cr | 0.05-0.8 |
| Mo | ≤0.2 |
| Al | 0.03-1.0 |
| Nb | ≤0.04 |
| V | ≤0.04 |
| Ti | 0.02-0.06 |
| B | 0.001-0.007 |
| Cu | ≤0.15 |
| Ni | ≤0.15 |
| P | ≤0.02 |
| S | ≤0.005 |
| N | 0.003-0.005 | and the heat affected zone in the spot welded joint may be free from cracks having a length of more than 100 μm.

The steel sheet provided with the Zn containing layer preferably fulfils at least one of the requirements a), b) and c):

a) a composition consisting of (in wt. %):

| | |
|---|---|
| C | 0.15-0.25 |
| Si | 0.7-1.6 |
| Mn | 2.2-2.8 |
| Cr | 0.01-0.8 |
| Mo | ≤0.2 |
| Al | 0.03-1.0 |
| Ti | 0.02-0.04 |
| B | 0.001-0.005 |
| Ti/B | 5-30 | wherein the composition fulfils at least one of the following requirements with respect to the impurities:

| | |
|---|---|
| Cu | ≤0.08 |
| Ni | ≤0.08 |
| Nb | ≤0.005 |
| V | ≤0.01 |
| P | ≤0.01 |
| S | ≤0.003 |
| N | 0.003-0.005 |
| Sn | ≤0.015 |
| Zr | ≤0.006 |
| As | ≤0.012 |
| Ca | ≤0.005 |
| H | ≤0.0003 |
| O | ≤0.0020 | b) a multiphase microstructure comprising at least one of (in vol. %):

| | |
|---|---|
| bainitic ferrite | ≥50 |
| tempered martensite | ≤30 |
| fresh martensite | ≤20 |
| retained austenite | 4-20 |
| polygonal ferrite | ≤10 | c) at least one of the following mechanical properties

| | | |
|---|---|---|
| tensile strength ($R_m$) | 1100-1350 | MPa |
| yield strength ($R_{p0.2}$) | 780-1100 | MPa |
| total elongation ($A_{50}$) | ≥7% | |
| hole expansion ratio ($\lambda$) | ≥20% | | d) and the heat affected zone in the spot welded joint may preferably be free from cracks having a length of more than 50 μm.

The multiphase microstructure referred to above may comprise at least one of (in vol. %):

| | |
|---|---|
| bainitic ferrite | ≥60 |
| tempered martensite | ≤20 |
| fresh martensite | ≤10 |
| retained austenite | 5-20 |
| polygonal ferrite | ≤6 |

Preferably, the multiphase microstructure comprises bainite, bainitic ferrite and tempered martensite in a total amount of at least of 80 volume % and/or at least one of (in vol. %):

| | |
|---|---|
| bainitic ferrite | ≥65 |
| tempered martensite | ≤15 |
| fresh martensite | ≤5 |
| retained austenite | 6-20 |
| polygonal ferrite | ≤5 |

The steel sheet provided with the Zn containing layer referred to above fulfils all requirements set out in claims 2, 3 or 4.

The invention also relates to an assembly of at least two steel sheets including a spot welded joint as defined in any of the claims 1-7.

The resistance welded joint may be produced by method comprising the following steps:
(i) providing a hot rolled strip
(ii) batch annealing the strip at 450-650° C. for a total time 2 to 20 hours in a bell furnace, preferably 5-10 hours,
(iii) cold rolling the batch annealed strip with a thickness reduction of at least 50%
(iv) continuously annealing the cold rolled strip at a temperature of 800-1000° C. for 30 to 160 seconds
(v) cooling the strip to a temperature of 200 to 500° C. for 50 to 500 seconds
(vi) providing the strip with a Zn containing layer
(vii) cutting the strip to obtain cold rolled steel sheets provided with a Zn containing layer
(viii) resistance spot welding said sheet to another steel sheet The Zn containing layer is preferably applied by means of hot dip galvanizing, galvannealing or electrolytically galvanizing.

EXAMPLE

A steel having the following composition was produced by conventional metallurgy by converter melting and secondary metallurgy:

| | |
|---|---|
| C | 0.22 |
| Si | 1.5 |
| Mn | 2.5 |
| Cr | 0.1 |
| Al | 0.044 |
| Ti | 0.03 |
| B | 0.0025 |
| Cu | 0.03 |
| Ni | 0.01 |
| P | 0.01 |
| S | 0.003 |
| N | 0.004 | balance Fe and impurities.

The steel was continuously cast and cut into slabs. The slabs were reheated and subjected to hot rolling to a thickness of about 2.8 mm. The hot rolling finishing temperature was about 900° C. and the coiling temperature about 550° C. The hot rolled strips were pickled and batch annealed at about 580° C. for a total time of 10 hours in a bell furnace in order to reduce the tensile strength of the hot rolled strip and thereby reducing the cold rolling forces. The strips were thereafter cold rolled in a five stand cold rolling mill to a final thickness of about 1.3 mm and finally subjected to continuous annealing in a Continuous Annealing Line (CAL).

The annealing cycle consisted of heating to a temperature of about 850° C., soaking for about 120 s, cooling during 30 seconds to an overaging temperature of about 405° C., isothermal holding at the overaging temperature for about 1-3 minutes and final cooling to the ambient temperature. One strip thus obtained was provided with a Zn containing layer by hot dip galvanising (GI) the one other was provided with an electrogalvanized (EG) coating. The strip thus obtained were free from FM, had a matrix of BF and contained 7% RA. The tensile strength ($R_m$) was 1220 MPa. The strips were cut into sheets and subjected to resistance spot welding in order to examine their crack sensitivity.

The tests were made in two steps. First, the maximum current $I_{max}$ was determined in accordance with the standardized test described in SEP1220-2 (Stahl Eisen Prüfblätter) fot the standard two sheet combination. In the second step a three sheet combination was subjected to RSW a the same current ($I_{max}$) but the welding time was doubled in order to increase the heat input. For each combination 8 spots were welded and the occurrence of cracks in the HAZ was manually examined in a light optical microscope on metallographically prepared samples. It was found that there was not any HAZ cracks longer than 60 μm in any of the samples and that the EG samples were less prone to cracking than the GI samples.

The resistance spot welded joint of the present invention can be widely applied to high strength structural parts in automobiles.

The invention claimed is:
1. A resistance spot welded joint between at least a first steel sheet and a second steel sheet, wherein the first steel sheet is provided with a Zn containing layer, wherein the first steel sheet has a tensile strength of at least 980 MPa, a multiphase microstructure comprising bainite, bainitic ferrite and tempered martensite in a total amount of at least of 75 volume % and retained austenite in an amount of 3.5-20 volume %, and wherein the first steel sheet has a composition consisting of, in weight %:

| | |
|---|---|
| C | 0.1-0.3 |
| Si | 0.2-3.0 |
| Mn | 1.0-3.0 |
| Cr | ≤2.0 |
| Mo | ≤0.5 |
| Al | ≤2.0 |
| Nb | ≤0.2 |
| V | ≤0.2 |
| Ti | 0.01-0.15 |
| B | 0.0005-0.01, | and
balance Fe apart from impurities,
wherein a heat affected zone in the resistance spot welded joint is free from cracks having a length of more than 500 μm, and
wherein the multiphase microstructure comprises, in volume %:

| | |
|---|---|
| bainitic ferrite | ≥55, |
| polygonal ferrite | ≤4, and |
| tempered martensite | >0 and ≤30. |

2. The resistance spot welded joint according to claim 1, wherein the first steel sheet has the composition fulfilling at least one of the following requirements, in weight %:

| | |
|---|---|
| C | 0.15-0.25 |
| Si | 0.6-2.0 |
| Mn | 2.2-2.8 |
| Cr | 0.01-0.8 |
| Mo | ≤0.2 |
| Al | 0.03-1.0 |
| Nb | ≤0.04 |
| V | ≤0.04 |
| Ti | 0.02-0.06 |
| B | 0.001-0.007 | wherein the composition also fulfils at least one of the following requirements with respect to impurity content, in weight %:

| | |
|---|---|
| Cu | ≤0.15 |
| Ni | ≤0.15 |
| P | ≤0.02 |
| S | ≤0.005 |
| N | 0.003-0.005, | and
wherein the heat affected zone in the resistance spot welded joint is free from cracks having a length of more than 200 μm.

3. The resistance spot welded joint according to claim 1, wherein the first steel sheet fulfils at least one of the requirements a), b), c) and d):
a) the composition consisting of, in weight %:

| | |
|---|---|
| C | 0.15-0.25 |
| Si | 0.7-1.6 |
| Mn | 2.2-2.8 |
| Cr | 0.01-0.8 |
| Mo | ≤0.2 |
| Al | 0.03-1.0 |
| Ti | 0.02-0.04 |
| B | 0.001-0.005 |
| Ti/B | 5-30 | wherein the composition fulfils at least one of the following requirements with respect to the impurities:

| | |
|---|---|
| Cu | ≤0.08 |
| Ni | ≤0.08 |
| Nb | ≤0.005 |
| V | ≤0.01 |
| P | ≤0.01 |
| S | ≤0.003 |
| N | 0.003-0.005 |
| Sn | ≤0.015 |
| Zr | ≤0.006 |
| As | ≤0.012 |
| Ca | ≤0.005 |
| H | ≤0.0003 |
| O | ≤0.0020 | b) the multiphase microstructure comprising at least one of, in volume %:

| | |
|---|---|
| bainitic ferrite | ≥50 |
| tempered martensite | ≤30 |
| fresh martensite | ≤20 |
| retained austenite | 4-20 |
| polygonal ferrite | ≤10 | c) at least one of the following mechanical properties;

| | |
|---|---|
| tensile strength ($R_m$) | 1100-1350 MPa |
| yield strength ($R_{p0.2}$) | 780-1100 MPa |
| total elongation ($A_{50}$) | ≤7% |
| hole expansion ratio (λ) | ≤20%, | and
d) wherein the heat affected zone in the resistance spot welded joint is free from cracks having a length of more than 50 μm.

4. The resistance spot welded joint according to claim 1, wherein the multiphase microstructure comprises at least one of, in volume %:

| | |
|---|---|
| bainitic ferrite | ≥60 |
| tempered martensite | ≤20 |
| fresh martensite | ≤10 |
| retained austenite | 5-20, or |
| polygonal ferrite | ≤6. |

5. The resistance spot welded joint according to claim 1, wherein the multiphase microstructure comprises bainite, bainitic ferrite and tempered martensite in a total amount of at least of 80 volume % and at least one of, in volume %:

| | |
|---|---|
| bainitic ferrite | ≥65 |
| tempered martensite | ≤15 |
| fresh martensite | ≤5 |
| retained austenite | 6-20, or |
| polygonal ferrite | ≤5. |

6. The resistance spot welded joint according to claim 1, wherein the first steel sheet fulfils the requirements of:
a) the composition consisting of, in weight %:

| | |
|---|---|
| C | 0.15-0.25 |
| Si | 0.7-1.6 |
| Mn | 2.2-2.8 |
| Cr | 0.01-0.8 |
| Mo | <0.2 |
| Al | 0.03-1.0 |
| Ti | 0.02-0.04 |
| B | 0.001-0.005 |
| Ti/B | 5-30 |
| V | ≤0.01, | wherein the composition fulfils the following requirements with respect to the impurities:

| | |
|---|---|
| Cu | ≤0.08 |
| Ni | ≤0.08 |
| Nb | ≤0.005 |
| P | ≤0.01 |
| S | ≤0.003 |
| N | 0.003-0.005 |
| Sn | ≤0.015 |

-continued

| | |
|---|---|
| Zr | ≤0.006 |
| As | ≤0.012 |
| Ca | ≤0.005 |
| H | ≤0.0003 |
| O | ≤0.0020, | b) the multiphase microstructure comprising, in volume %:

| | |
|---|---|
| fresh martensite | ≤20 |
| retained austenite | 4-20, | c) the following mechanical properties:

| | |
|---|---|
| tensile strength ($R_m$) | 1100-1350 MPa |
| yield stregnth ($R_{p0.2}$) | 780-1100 MPa |
| total elongation ($A_{50}$) | ≥7% |
| hole expansion ratio ($\lambda$) | ≥20%, | and d) wherein the heat affected zone in the resistance spot welded joint is free from cracks having a length of more than 50 μm.

7. The resistance spot welded joint according to claim 2, wherein the first steel sheet has the composition consisting of, in weight %:

| | |
|---|---|
| C | 0.15-0.25 |
| Si | 0.6-2.0 |
| Mn | 2.2-2.8 |
| Cr | 0.05-0.8 |
| Mo | ≤0.2 |
| Al | 0.03-1.0 |
| Nb | ≤0.04 |
| V | ≤0.04 |
| Ti | 0.02-0.06 |
| B | 0.001-0.007 |
| Cu | ≤0.15 |
| Ni | ≤0.15 |
| P | ≤0.02 |
| S | ≤0.005 |
| N | 0.003-0.005, | and
wherein the heat affected zone in the resistance spot welded joint is free from cracks having a length of more than 100 μm.

8. The resistance spot welded joint according to claim 2, wherein the first steel sheet has the composition fulfilling the following requirements, in weight %:

| | |
|---|---|
| C | 0.15-0.25 |
| Si | 0.6-2.0 |
| Mn | 2.2-2.8 |
| Cr | 0.01-0.8 |
| Mo | ≤0.2 |
| Al | 0.03-1.0 |
| Nb | ≤0.04 |
| V | ≤0.04 |
| Ti | 0.02-0.06 |
| B | 0.001-0.007, | wherein the composition also fulfils the following requirements with respect to impurity content, in weight %:

| | |
|---|---|
| Cu | ≤0.15 |
| Ni | ≤0.15 |
| P | ≤0.02 |
| S | ≤0.005 |
| N | 0.003-0.005, | and
wherein the heat affected zone in the resistance spot welded joint is free from cracks having a length of more than 200 μm.

9. The resistance spot welded joint according to claim 2, wherein the first steel sheet has the composition consisting of, in weight %:

| | |
|---|---|
| C | 0.15-0.25 |
| Si | 0.6-2.0 |
| Mn | 2.2-2.8 |
| Cr | 0.05-0.8 |
| Mo | ≤0.2 |
| Al | 0.03-1.0 |
| Nb | ≤0.04 |
| V | ≤0.04 |
| Ti | 0.02-0.06 |
| B | 0.001-0.007 |
| Cu | ≤0.15 |
| Ni | ≤0.15 |
| P | ≤0.02 |
| S | ≤0.005 |
| N | 0.003-0.005, | and
wherein the heat affected zone in the resistance spot welded joint is free from cracks having a length of more than 100 μm.

10. A method of producing the resistance spot welded joint according to claim 1, comprising the steps of:
(i) providing a hot rolled strip having the composition of the first steel sheet;
(ii) batch annealing the strip at 450-650° C. for a total time of 2 to 20 hours;
(iii) cold rolling the batch annealed strip with a thickness reduction of at least 50%;
(iv) continuously annealing the cold rolled strip at a temperature of 800-1000° C. for 30 to 160 seconds;
(v) cooling the strip to a temperature of 200 to 500° C. for 50 to 500 seconds;
(vi) providing the strip with the Zn containing layer;
(vii) cutting the strip to obtain the first steel sheet provided with the Zn containing layer; and
(viii) resistance spot welding the first steel sheet to a second steel sheet.

11. A method of claim 10 wherein the Zn containing layer is formed by means of hot dip galvanizing, galvannealing or electrolytically galvanizing.

12. The method of producing the resistance spot welded joint according to claim 10, wherein the batch annealing is for a total time of 5 to 10 hours.

\* \* \* \* \*